United States Patent [19]

Aucktor

[11] 4,177,654
[45] Dec. 11, 1979

[54] TRANSMISSION SHAFT

[75] Inventor: Erich Aucktor, Offenbach am Main, Fed. Rep. of Germany

[73] Assignee: Löhr & Bromkamp G.m.b.H., Offenbach am Main, Fed. Rep. of Germany

[21] Appl. No.: 843,111

[22] Filed: Oct. 17, 1977

[30] Foreign Application Priority Data

Oct. 27, 1976 [DE] Fed. Rep. of Germany ....... 2648569

[51] Int. Cl.² .............................................. F16D 3/02
[52] U.S. Cl. ....................................... 64/21; 64/1 C; 64/23
[58] Field of Search .............................. 64/23, 21, 1 C

[56] References Cited

U.S. PATENT DOCUMENTS

| 2,107,721 | 2/1938 | Swenson | 64/23 |
| 2,831,545 | 4/1958 | Christiano | 64/1 C |
| 3,618,340 | 11/1971 | Giesthoff | 64/23 |
| 4,068,499 | 1/1978 | Sharp | 64/21 |

FOREIGN PATENT DOCUMENTS

| 565060 | 10/1958 | Canada | 64/23 |
| 1089640 | 9/1960 | Fed. Rep. of Germany | 64/23 |
| 1914275 | 10/1970 | Fed. Rep. of Germany | 64/21 |
| 1341275 | 12/1962 | France | 64/1 C |
| 1373752 | 8/1963 | France | 64/23 |
| 1339753 | 12/1973 | United Kingdom | 64/23 |

*Primary Examiner*—Charles J. Myhre
*Assistant Examiner*—R. C. Turner
*Attorney, Agent, or Firm*—Toren, McGeady and Stanger

[57] ABSTRACT

A variable length transmission shaft for drive transmissions in various types of machinery includes a pair of parallel rotating or synchronous speed torque coupling joints and a connecting shaft carried between the coupling joints. Each of the coupling joints has inner and outer joint members which are slidable with respect to each other, and torque transmitting balls arranged between the inner and outer joint members for transmitting torque between the inner and outer joint members. The connecting shaft is formed of a pair of telescopically cooperating shaft members which are arranged for relative sliding movement with respect to each other. One of the shaft members is coupled to the inner joint member of one of the coupling joints and the other shaft member is coupled to the inner joint member of the other coupling joint. The overall length of the transmission shaft can be varied by effecting sliding movement of one of the shaft members with respect to the other shaft member.

1 Claim, 2 Drawing Figures

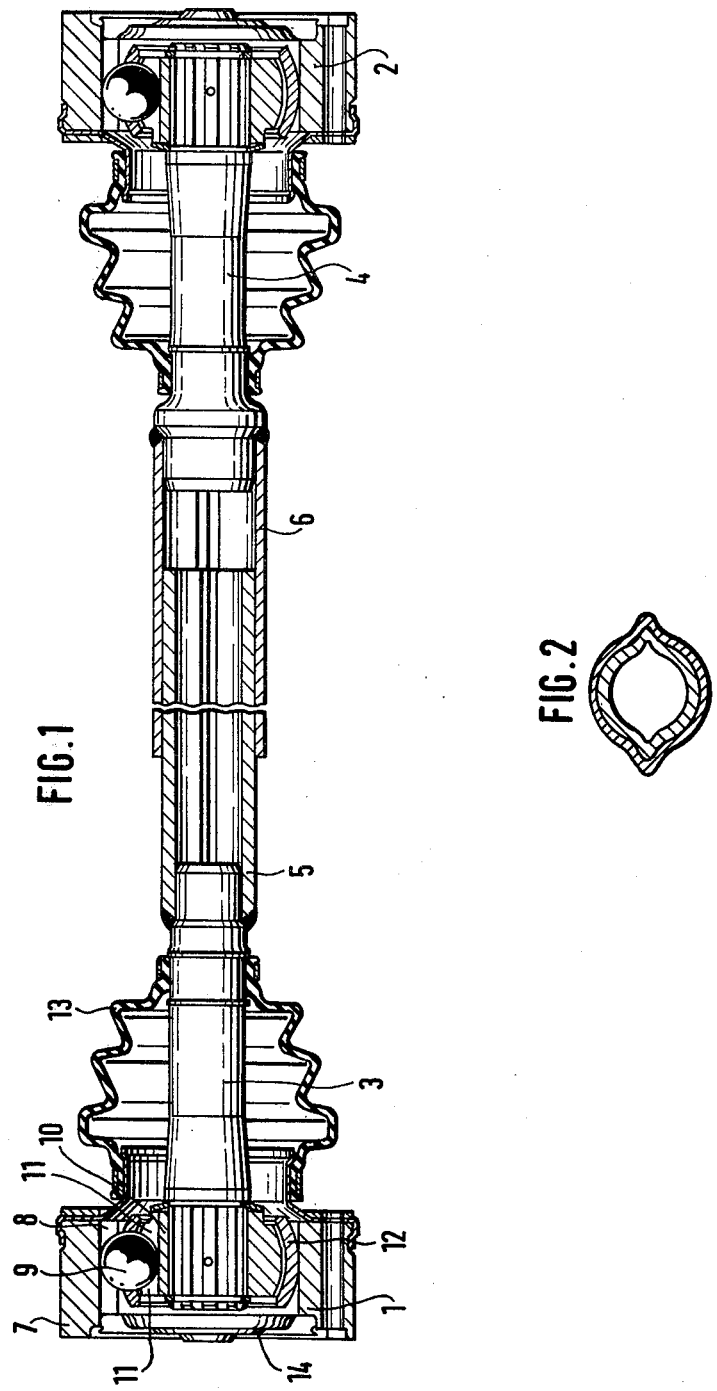

TRANSMISSION SHAFT

BACKGROUND OF THE INVENTION

The present invention relates generally to transmission shafts for transmitting drive power in various types of machinery, and more particularly to a transmission shaft which is capable of having its overall length varied.

Transmission shafts which are associated with a pair of sliding parallel or synchronous speed torque coupling joints are known in the art such as from German PS No. 1,914,275. The transmission shaft known from this prior art, however, might have to be cut and shortened to a different length if it is desired to use this shaft in different applications. For example, if such a shaft is to be applied to weaving looms or other textile machinery, dimensional requirements of the machinery might necessitate altering the length of the shaft at the time of installation. This therefore requires that the shaft have a particular longitudinal dimension to permit removal and reassembly in a new machine. Different coupling members might have to be used, or it might have to be provided with a pin to be welded into the shaft for properly securing the shaft after it is cut and readjusted to a new length.

The prior art also includes cardanshafts which are associated with a pair of universal joints of the cruciform of cardan type and which have separate means for longitudinal adjustment using splined shaft arrangements. In such arrangements, means for accommodating length variations between the coupling joints as a result of vibrations of other kinetic effects of the machinery have been provided. Attempts to accommodate such length variations have included the provision of intermediate shafts of various lengths for use in different applications. These solutions, however, have been found to be inadequate since they also involve the possibility of cutting or trimming the length of the intermediate shafts in order for the transmission shaft to be accommodated within certain space requirements. Additionally, when using such intermediate shafts, each shaft must be provided with connector flanges which must be in precise parallel alignment or else the output of the shaft may not have the required synchronous speed. To achieve the required alignment of the various intermediate shafts is an extremely laborious and time consuming operation. Additionally, length adjustments can only be accomplished using splined shaft arrangements, however, this causes considerable thrust forces and heavy wear on the transmission shaft parts. Further, cruciform joint bearings usually require regular lubrication for satisfactory operation.

It is accordingly an object of the present invention to provide a drive transmission shaft which has a readily variable length for easy adaptation to various dimensional requirements when used in different applications, and is also capable of automatically adjusting to minor variations in the distance between the coupling joints as a result of vibrations or other forces acting on various portions of the machine.

More specifically, it is an object of the present invention to provide a variable length drive transmission shaft having a pair of torque transmitting coupling joints with a connecting shaft carried between the coupling joints having telescopically cooperating shaft members arranged for sliding movement with respect to each other to thereby enable the overall length of the transmission shaft to be varied in order to fit various dimensional requirements or to automatically adjust to minor length variations in the distance between the coupling joints.

SUMMARY OF THE INVENTION

The foregoing objects are generally accomplished by providing a machinery drive transmission shaft which has a pair of parallel or synchronous speed torque coupling joints and a connecting shaft carried between the coupling joints. Each of the coupling joints has inner and outer joint members which are slidable with respect to each other, and torque transmitting balls arranged between the inner and outer joint members to provide a torque coupling between the inner and outer joint members. The connecting shaft includes a pair of telescopically cooperating shaft members which are arranged for relative sliding movement of one shaft member with respect to the other shaft member in order to allow for variation in the overall length of the transmission shaft. Each shaft member is appropriately coupled to the inner joint member of its respective coupling joint to provide torque transmission between the coupling joint and the shaft. The shaft members are of non-circular cross section to insure proper transmission of driving torque between the shaft members.

The foregoing arrangement provides a significant advantage over the prior art in that no additional work or cutting operation must be performed on the transmission shaft itself in order to install the shaft in any type of machine at any location having points of connection within a variety of dimensions. The transmission shaft according to the present invention merely has to be bolted, screwed or otherwise coupled in place between appropriate connector flanges or supports on the machine.

The present invention also eliminates the need for intermediate shafts in order to adjust the transmission shaft to various dimensional requirements. Also, any errors in length adjustment of the transmission shaft during installation are easily accommodated by the telescopically arranged shaft members. Accordingly, any minor variations in the distance between the coupling points of the shaft can automatically be adjusted for by the transmission shaft according to the present invention.

Further, precise alignment between the connector flanges or supports on the machine are not required because the synchronous speed coupling joints preclude any uneven operation.

Another advantageous feature of the present invention is that it is capable of automatic length adjustment as a result of length variations in the transmission assembly of the machine because of possible movement between the connector flanges or supports of the machine or as a result of any vibration, oscillation or shifting of mounting parts of the machine. Such variations and minor length adjustments will be automatically accommodated for by the shaft of the present invention.

Other features, objects and advantages of the present invention will become more apparent from the detailed description of the present invention in connection with the accompanying drawings.

BRIEF DESCRIPTION OF THE DRAWINGS

In the drawings:

FIG. 1 is a longitudinal sectional view of the transmission shaft according to the present invention; and FIG. 2 is a transverse sectional view taken through the telescopically cooperating shaft members.

DESCRIPTION OF THE INVENTION

Referring now in more detail to the accompanying drawings, the transmission shaft shown in FIG. 1 includes a pair of substantially identical parallel or synchronous speed coupling joints 1 and 2 which have axially slidable parts as will be appreciated more fully hereinafter. A connecting shaft, which includes spindles 3 and 4 and telescopically cooperating hollow shaft members 5 and 6 connected with spindles 3 and 4, respectively, is supported between the coupling joints 1 and 2.

Each of the coupling joints 1 and 2 is of identical construction and for the sake of simplicity, only one of the coupling joints will be hereinafter more specifically described. Each of the coupling joints has a substantially cylindrical outer joint member 7 forming an interior cavity. The outer joint member 7 has axially extending rectilinear grooves 8 arranged about its interior cylindrical surface. An inner joint member 10 is located within the interior cavity formed by the outer joint member 7. Grooves 11 are positioned circumferentially about the outer surface of inner joint member 10. The axially extending grooves 11 are coupled with the axially extending grooves 8 of the outer joint member 7 through torque transmitting balls 9.

Each groove 8 is radially aligned with a corresponding groove 11 on the inner joint member 10 and the grooves are coupled to each other by a torque transmitting ball 9. By locating a plurality of balls circumferentially between the inner and outer joint members, the outer joint member is coupled with the inner joint member for appropriate transmission of torque from one member to the other.

A cage 12 is positioned between the inner joint member 10 and the outer joint member 7 for supporting the plurality of balls 9. The cage 12 has appropriate openings or windows for guiding and supporting the balls 9 between aligned grooves 8 and 11. The inner surface of cage 12 is in contact engagement with the outer surface of inner joint member 10 and the exterior surface of the cage 12 is in sliding contact engagement with the inner cylindrical surface of the outer joint member 7. Accordingly, the inner joint member 10 is axially slidable with respect to the outer joint member 7 and balls 9 carried in the various openings or windows of the cage 12 can also axially roll between aligned grooves 8 and 11.

Spindles 3 and 4 have tapered ends which are accommodated in a bore provided in the inner joint member 10 of coupling joints 1 and 2 respectively. As a result of the inner joint member 10 being carried on an end of the spindles 3 and 4, the connecting shaft is appropriately coupled between the coupling joints 1 and 2. In order to prevent foreign bodies such as dirt, dust, moisture or other matter from entering the coupling joint, each joint is provided with an end cap 14 on one side of the joint and with a concertina type boot 13 covering on the other side of the joint. One end of the boot is wrapped about and coupled with a flange on the outer joint member and the other end of the boot is wrapped about and coupled with the spindle 3 or 4.

The ends of the spindles 3 and 4 which face each other are stepped down terminating in a weld nipple. Hollow shaft members 5 and 6 are carried on the weld nipples of spindles 3 and 4, respectively, and are welded thereto. The outer diameter of the weld nipples on spindles 3 and 4 preferably correspond to the inner diameter of shaft members 5 and 6 respectively. Shaft members 5 and 6 are thus coupled with the inner joint member 10 of coupling joints 1 and 2 respectively.

Shaft members 5 and 6 are hollow with shaft member 5 slidably engaged within shaft member 6 in a telescoping arrangement. To insure stability, the outside diameter of hollow shaft member 5 is equal to or slightly less than the inside diameter of hollow shaft member 6 with which it telescopically cooperates. Shaft members 5 and 6 have complementary non-circular cross sections such as illustrated in FIG. 2, in order to insure proper torque transmission from one shaft member to the other.

After the transmission shaft of the present invention is fully assembled with the spindles 3 and 4 connected with their respective coupling joints 1 and 2 and the hollow shaft members 5 and 6 telescopically joined together, the trasmission shaft is ready for installation for transmitting drive power in various types of machines. The transmission shaft can be installed between coupling flanges or support members of the machine having any length dimension between the support members within a given range. It may in some circumstances be necessary to trim the ends of the hollow shaft members 5 and 6 in order to render the transmission shaft useable between dimensions outside the initial range. It is not necessary that the axes of the outer joint members 7 of coupling joints 1 and 2 be in precise parallel alignment since the parallel or synchronous speed coupling joints will automatically produce parallel or synchronous speed output.

It will be apparent that any variations in length between the coupling flanges or supports of the machine will automatically be accommodated by sliding movement of shaft member 5 within shaft member 6. If it is desired to use the transmission shaft in a different application, it can simply be disconnected from the existing drive assembly and reassembled with a different assembly which may have different dimensions between the supports for the transmission shaft. However, because of the telescopically cooperating shaft members 5 and 6, any such variations in length are easily accommodated for by sliding movement between the shaft members.

Additionally, it will be appreciated that the balls 9 can be axially shifted in their position between grooves 8 and 11 by merely varying the position of shaft member 5 within shaft member 6. Such shifting of the balls 9 in their grooves may be desirable in the event that the point of contact between the ball and grooves becomes worn as a result of use. After axially shifting the ball within the groove, it may continue to operate in unworn surfaces of the grooves to thereby provide a longer service life of the transmission shaft.

Each of the balls preferably has its diameter which is aligned with the radial contact points between grooves 8 and 11 lying in the same plane so that any axial shifting of the balls within the grooves will cause them to shift to a new plane of operation.

When fully operating, driving power can be transmitted through the shaft from one coupling joint to the other. For example, if coupling joint 1 is the input side and coupling joint 2 the output side of the transmission shaft, driving power will be provided to the outer joint member 7 of coupling joint 1. Driving torque will be transmitted through torque transmission balls 9 to inner joint member 10 as a result of balls 9 coupled between the inner and outer joint members in grooves 8 and 11. The torque will then be transmitted from inner joint member 10 of coupling joint 1 to spindle 3 as a result of the connection of spindle 3 with inner joint member 10. The power will then be transmitted to shaft member 5 as a result of the welded connection between shaft 5 and spindle 3 and then to shaft member 6 as a result of the non-circular cross section of the shaft members. The power will then be transmitted through spindle 4 to inner joint member 10 of coupling joint 2 and through transmission balls 9 to outer joint member 7 where the power can be picked off for performing necessary work in the machine.

Coupling joints other than of the design described herein may also be used with the transmission shaft of the present invention taking advantage of the telescopic sliding engagement between the shaft members of the connecting shaft.

While the invention has been described and illustrated with respect to a certain preferred embodiment which produces satisfactory results, it will be appreciated by those skilled in the art after understanding the purposes of the invention that various changes and modifications may be made without departing from the spirit and scope of the invention and it is therefore intended to cover all such changes and modifications in the appended claims.

What is claimed is:

1. A machine drive transmission shaft having a variable length adjustment comprising a pair of synchronous speed torque coupling joints each rotatable about an axis with said joints disposed in spaced relation and with the axes thereof disposed in general alignment, an axially elongated telescopic shaft extending between and in general axial alignment with and interconnecting said coupling joints, each of said coupling joints comprises an inner joint member having an outer surface encircling the axis of said inner joint member and with a plurality of axially extending circumferentially spaced rectilinear grooves formed therein, a hollow outer joint member enclosing said inner joint member and having an inner surface encircling the axis of said outer joint member and spaced outwardly from the outer surface of said inner joint member, the inner surface of said outer joint member having a plurality of axially extending circumferentially spaced rectilinear grooves formed therein, a plurality of balls each slidably seated in a different one of the grooves in said inner joint member and in an oppositely disposed groove in said outer joint member for transmitting torque between said inner and outer joint members, said inner and outer joint members in each said coupling joint being axially slidable relative to one another, said telescopic shaft comprising a spindle connected to each said inner joint member and extending therefrom in the axial direction of said telescopic shaft toward the other said spindle, a first shaft member attached to and extending axially from one of said spindles and a hollow second shaft member attached to and extending axially from the other one of said spindles, said first shaft member extending into said hollow second shaft member in closely fitting sliding relation so that the overall length of the transmission shaft can be varied, the outer surface of said first shaft member and the inner surface of said second shaft member having complementary non-circular interfitting cross sections so that torque can be transmitted therebetween, and a cage positioned between the inner surface of said outer joint member and the outer surface of said inner joint member and encircling said inner joint member, said cage having a plurality of circumferentially spaced openings therein for each of said balls.

* * * * *